No. 764,025. PATENTED JULY 5, 1904.
E. T. WOLF.
MACHINE FOR MAKING PIANO HAMMERS.
APPLICATION FILED MAY 20, 1903.
NO MODEL. 7 SHEETS—SHEET 1.

Fig. 1

WITNESSES:
INVENTOR
Edmund T. Wolf
BY
ATTORNEYS.

No. 764,025. PATENTED JULY 5, 1904.
E. T. WOLF.
MACHINE FOR MAKING PIANO HAMMERS.
APPLICATION FILED MAY 20, 1903.
NO MODEL. 7 SHEETS—SHEET 2.

Fig. 2

WITNESSES:
INVENTOR
Edmund T. Wolf
BY
ATTORNEYS.

No. 764,025. PATENTED JULY 5, 1904.
E. T. WOLF.
MACHINE FOR MAKING PIANO HAMMERS.
APPLICATION FILED MAY 20, 1903.
NO MODEL. 7 SHEETS—SHEET 4.

WITNESSES: INVENTOR
Edmund T. Wolf
BY
ATTORNEYS.

No. 764,025. PATENTED JULY 5, 1904.
E. T. WOLF.
MACHINE FOR MAKING PIANO HAMMERS.
APPLICATION FILED MAY 20, 1903.
NO MODEL. 7 SHEETS—SHEET 5.

WITNESSES
INVENTOR
Edmund T. Wolf
BY
ATTORNEYS

No. 764,025. PATENTED JULY 5, 1904.
E. T. WOLF.
MACHINE FOR MAKING PIANO HAMMERS.
APPLICATION FILED MAY 20, 1903.
NO MODEL. 7 SHEETS—SHEET 6.

WITNESSES
INVENTOR
Edmund T. Wolf
BY
ATTORNEYS.

No. 764,025. PATENTED JULY 5, 1904.
E. T. WOLF.
MACHINE FOR MAKING PIANO HAMMERS.
APPLICATION FILED MAY 20, 1903.
NO MODEL. 7 SHEETS—SHEET 7.

WITNESSES:
Joshua Bergstrom
W. F. Bernhard

INVENTOR
Edmund T. Wolf
BY Munn
ATTORNEYS

No. 764,025. Patented July 5, 1904.

UNITED STATES PATENT OFFICE.

EDMUND T. WOLF, OF NEW YORK, N. Y., ASSIGNOR TO STANDARD PIANO HAMMER AND FELT COMPANY, A CORPORATION OF NEW JERSEY.

MACHINE FOR MAKING PIANO-HAMMERS.

SPECIFICATION forming part of Letters Patent No. 764,025, dated July 5, 1904.

Application filed May 20, 1903. Serial No. 157,953. (No model.)

*To all whom it may concern:*

Be it known that I, EDMUND T. WOLF, a citizen of the United States, and a resident of the city of New York, borough of the Bronx, in the county and State of New York, have invented a new and Improved Machine for Making Piano-Hammers, of which the following is a full, clear, and exact description.

This invention relates to a machine for making piano-hammers, which will be hereinafter fully described and claimed.

It is well known that a piano-hammer consists of a hard core or shank, usually of wood and technically designated as a "molding," and a striking face or head made of felt, which is cemented to the molding or core under pressure. A set of these hammers for a piano vary in size, and because the felt is expensive it is usual to employ an inside layer of felt of cheaper grade.

The usual course of procedure in the manufacture of hammers is to employ a hand-press in which is placed a felt die or mold that contains the moldings and felt for producing a number of hammers, and the press is then operated by hand to subject the materials to pressure, after which the press and its contained parts are allowed to remain idle for a sufficient length of time, usually five or six hours, in order that the cement which unites the materials may set and harden. There are certain practical objections to the means and methods employed in the hand method of making piano-hammers, chief among which is the limited, irregular, and ungaged pressure to which the felt is subjected due to the operation of the press by hand and also because the machine must remain idle for so long a period of time necessary for the cement to harden and bind the felt and molding solidly together.

According to the present invention I produce a power-machine designed to subject the materials in the felt die or mold to such a high degree of pressure as will condense the fibers of the felt around the end of the molding and produce a solid hard striking-face at the active end of the hammer.

My machine is so constructed and operated that it does not remain idle for the period required for the cement to bind the felt and moldings, because the felt die or mold in a locked condition is removable at will from the machine, thus allowing the machine to be used in a practically continuous manner in the manufacture of sets of hammers.

By this invention I am able not only to reduce the cost of making piano-hammers, but I also produce hammers of a superior grade, the same being characterized by an improved pointed shape given to the striking-face formed by the condensed fibers of the felt covering at the end of the molding. I am also able to make all sets of hammers alike and uniform with respect to hardness and evenness of the felt by having an accurate gage of the amount of pressure applied.

The machine includes a bed on which is adapted to be placed a removable two-part felt die or mold, or a mold composed of various sections, on which die or mold is laid a long piece or length of felt, the latter being tapered from one end to the other, so as to produce when subsequently cut a series of coverings of different thicknesses for the different sizes of hammers forming the set. Above the place to be occupied by the felt die or mold the machine is constructed for the reception of a longitudinal pressure-head, which is equipped with a detachable holder or clamp for the reception of the plurality of wooden moldings or cores, and with this pressure-head is associated certain shiftable molding-pressure devices by means of which the pressure head, with its charge or load of moldings, may be lowered, so as to impose the moldings directly upon the length of felt previous to closing the felt die or mold and the felt strip around the moldings or cores, said pressure-head and devices serving to forcibly press the moldings upon the felt or embed them in said felt. The machine also includes a die-pressure mechanism by which the two-part felt die or mold may now be closed, so as to compress the felt under powerful pressure around the plurality of moldings, after which the felt die or mold is locked while the pressure is still applied. The machine now operates again to release the molding-pressure appliances, and the molding-clamp is unlocked from the longitudinal pressure-head, thus permitting the locked and loaded felt die or mold to be removed from the machine, so as to be set aside for the proper length of time to insure setting or hardening of the cement; but the parts of the machine are restored to normal positions in order that other felt dies or molds may be introduced to renew without delay the process of making other sets of hammers.

Reference is to be had to the accompanying drawings, forming a part of this specification, in which similar characters of reference indicate corresponding parts in all the figures.

Figure 2:
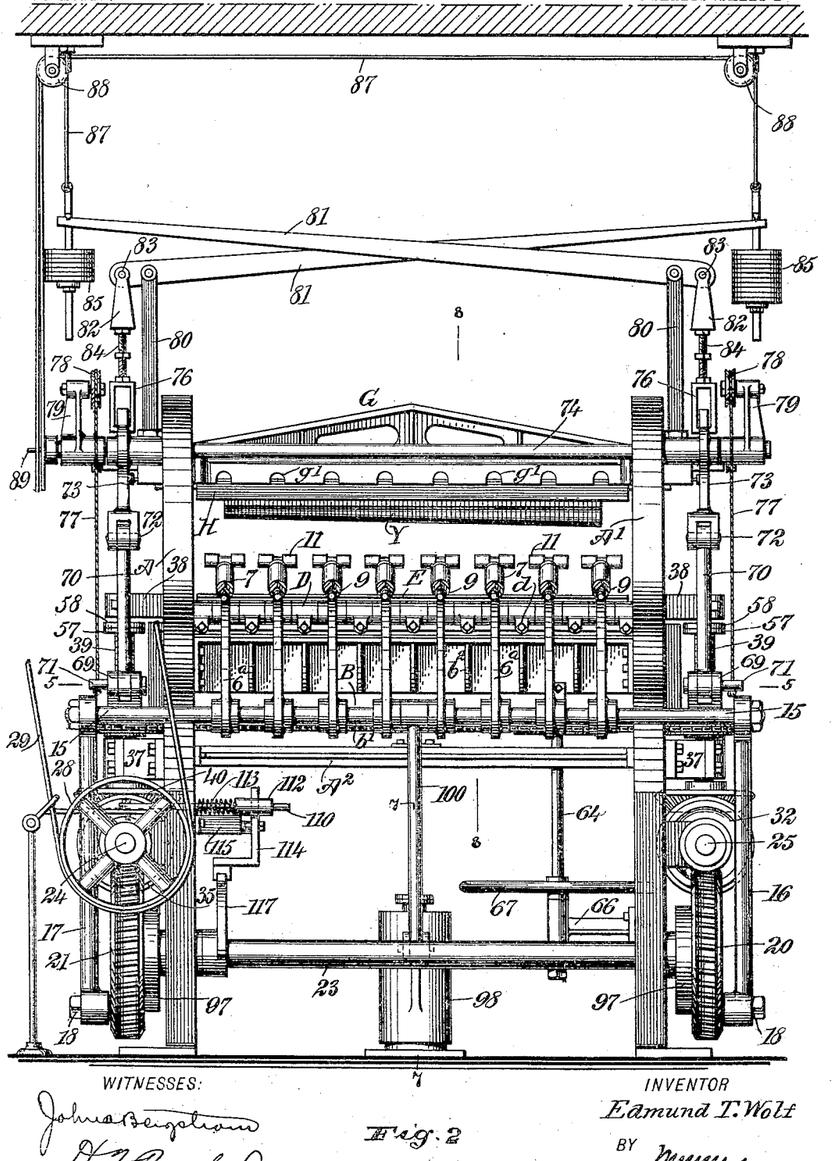
Fig. 2 is an elevation looking at one side of the machine from the right in Fig. 1.
Figure 8:
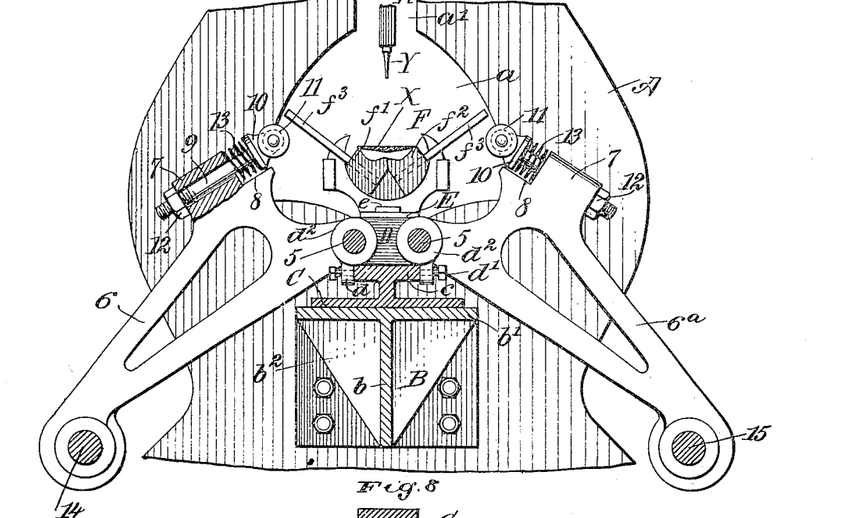
Fig. 8 is an enlarged detail view in cross-section through a part of the machine, showing the mold-pressure devices and the felt die or mold in their open positions, the plane of the section being indicated by the dotted line 8 8 of Fig. 2.
Figure 9:
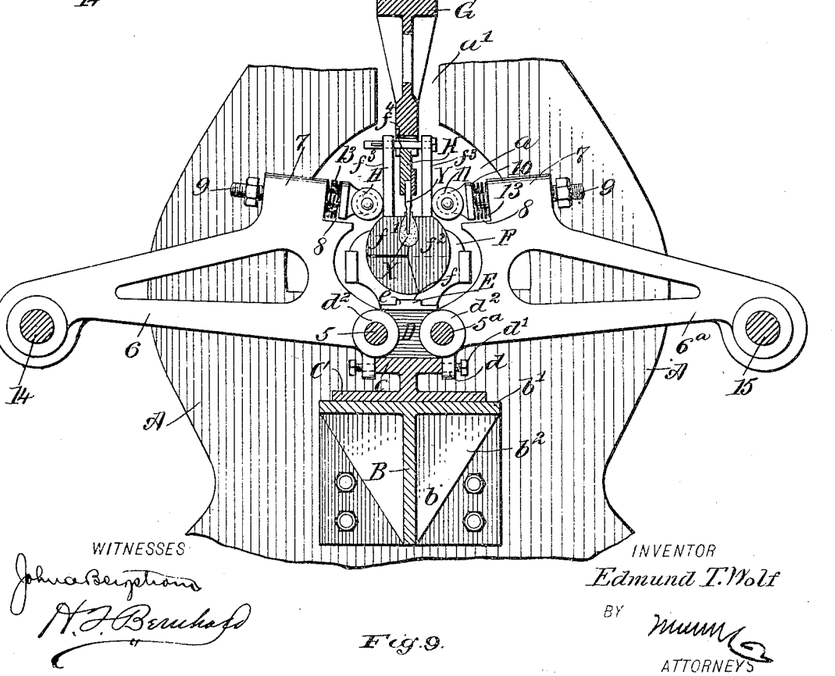
Fig. 9 is a view similar to Fig. 8, showing the mold-pressure devices and the felt die or mold in their closed positions.

The several operating mechanisms of my improved piano-hammer-making machine are mounted on a suitable framework, shown by the drawings as consisting of the end frames A A', which are united substantially by a horizontal beam B, and various other contrivances entering into the structure of the machine, said beam B having flanges $b$ $b'$ and a series of strengthening-webs $b^2$. (See Figs. 2, 8, and 9.) The beam B is bolted solidly at its ends to the end frames A A', and on the horizontal flange of this beam is securely bolted a bed C, having a top flange $c$, which carries a series of brackets D. A number of these brackets are employed, and they are disposed in endwise-abutting engagement, as shown by Fig. 2, said brackets having depending lugs $d$, which are provided with clamping-screws $d'$, adapted to bind against the head-flange $c$ of the bed C. The continuous series of brackets D are held solidly on the bed, and these brackets support or carry a track or rail E, which receives a felt die or mold F, the latter being insertible and removable by sliding it endwise into and from the machine. This track or rail E is shown by Figs. 8 and 9 as having an upstanding flange $e$ arranged to fit in a groove $f$ in the bottom of the felt die or mold F, and said track E forms a horizontal guideway which runs practically the full length of the machine, thus enabling me to use a long felt die or mold adapted to contain a strip or length of felt which is sufficient to make a complete set of piano-hammers.

I may employ any suitable type of felt die or mold in connection with the machine; but the construction of this mold does not form a part of the present invention. To enable others to understand the invention, I have shown one form of felt die or mold, (indicated at F,) which consists of two members $f'$ $f^2$, hinged in such a way as to present a solid smooth continuous surface on the inner side of the felt die or mold, substantially as shown by Fig. 8. The members of this divided felt die or mold are adapted to be opened and closed in a lateral direction, and these members are provided with a plurality of upstanding arms $f^3$, disposed in pairs and adapted in the closed position of the felt die or mold to be locked by transverse fasteners, such as the pins or bolts $f^4$. (Shown by Fig. 9.) The divided felt die or mold is adapted to receive a tapering layer of felt, substantially as shown by Fig. 8, and after the cores or moldings shall have been pressed upon this layer of felt in the operation of the machine the felt die or mold is closed and subjected to a high degree of pressure by the action of molding-pressure devices, which will now be described.

The series of brackets D are provided with bearings $d^2$ at the sides thereof, and in these bearings of said fixed brackets are supported the horizontal parallel arbors 5 $5^a$, the same lying close together and disposed below the track or rail E, which receives the mold F. On the arbors 5 $5^a$ are fulcrumed the two series of pressure-levers 6 $6^a$, each having the form shown more clearly by Figs. 8 and 9. The levers are approximately triangular, and they are fulcrumed at their lower inner corners by said parallel arbors. The levers are provided at their upper corners with short sleeves 7 and with the notches 8, and in these sleeves are slidably fitted the stems 9, each having a head 10, on which heads are loosely journaled roller-shoes 11, the same being adapted to rotate freely on the headed stem. Each stem is provided at its outer end with a nut 12, which limits the movement of the stem in one direction, and around the stem is placed a coiled spring 13, one end of which is seated against the sleeve 7 of the lever, while the other end acts against the head 10 of said stem in a way to force the roller-shoes toward the felt die or mold. It will be understood that the two series of levers are disposed on the opposite sides of the machine, and these levers are arranged to present their stems and roller-shoes in facing relation to the members $f'$ $f^2$ of the hinged felt die or mold when the latter is in position on the rail E within the machine. The levers are movable for a limited distance toward each other and toward the mold; but when the levers assume the downwardly-diverging position shown by Fig. 8 the roller-shoes 11 are spread and the felt die or mold can open freely within the frame. These levers are forced upwardly at their outer ends in order to press the inner ends and the roller-stems toward the felt die or mold, and during this inward movement of said roller-stems with the levers the shoes 11 engage with the arms $f^3$ of the divided felt die or mold in a way to press the mold-sections $f'$ $f^2$ into their closed positions.

Figure 3:
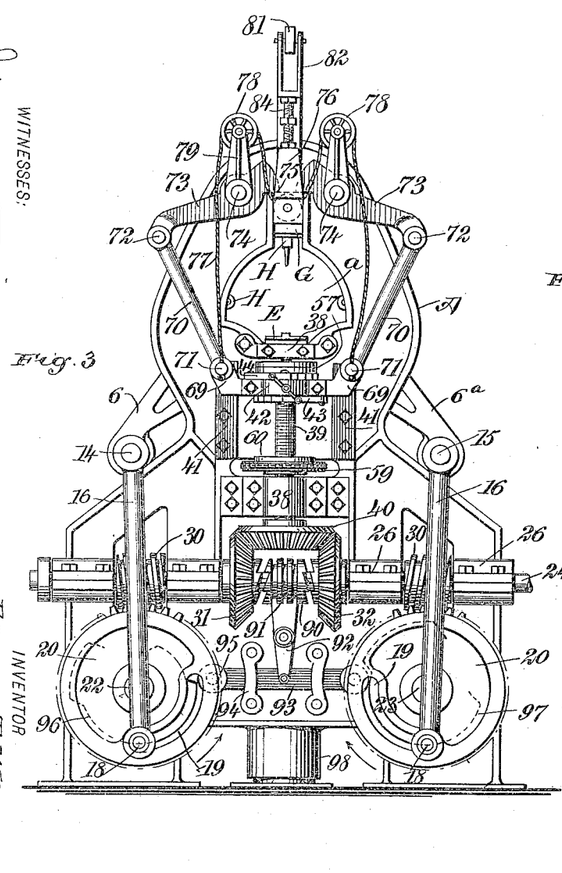
Figs. 3 and 4 are views in end elevation looking at the same end as in Fig. 1 and illustrating different positions of the parts during the operation of the machine.
Figure 4:
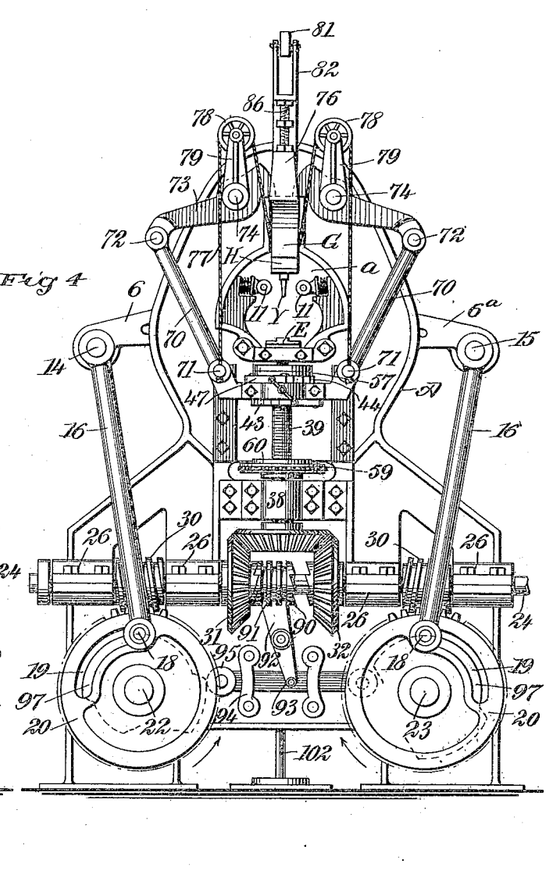
Figures 5, 6:
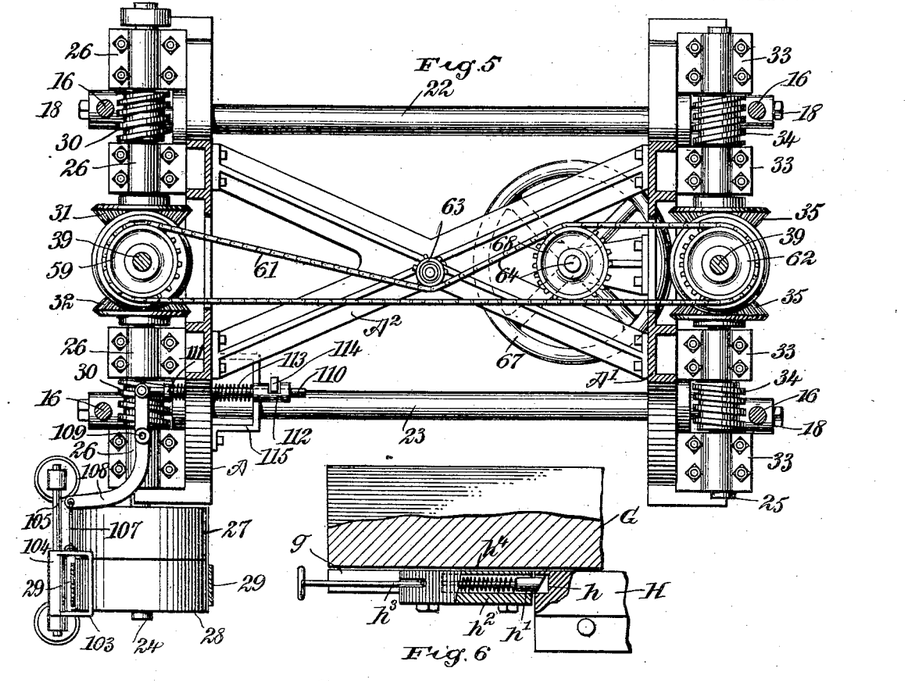
Fig. 5 is a horizontal sectional plan view taken in the plane of the dotted line 5 5 of Fig. 2.
Fig. 6 is an enlarged detail view showing a means for locking one end of the molding or core clamp to an end portion of the longitudinal pressure-head.
Figure 11:
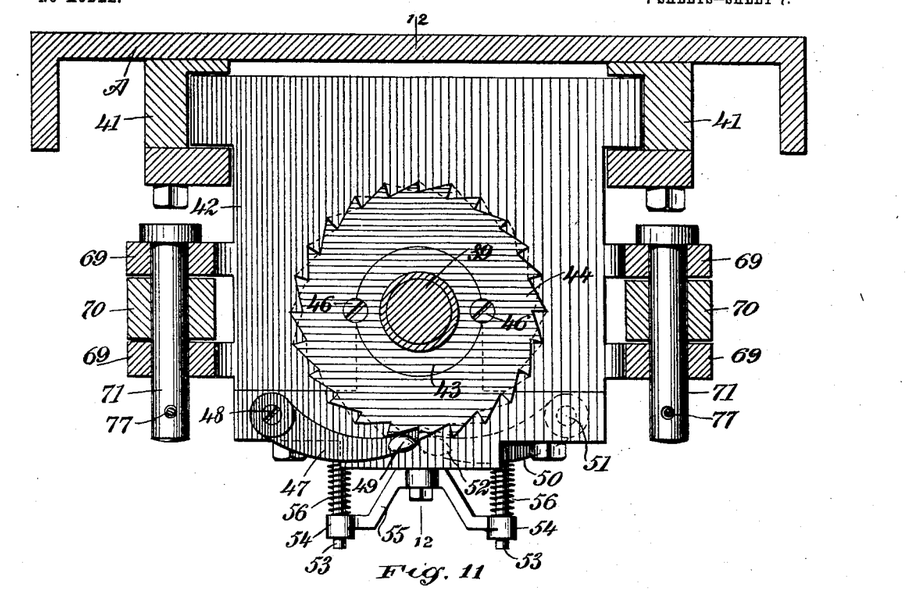
Fig. 11 is a sectional plan view, on an enlarged scale, of one of the vertically-slidable cross-heads and the means for actuating the same, said cross-head serving to actuate means for locking the molding-pressure devices of the longitudinal pressure-head in the lowered active positions of said parts.
Figure 12:
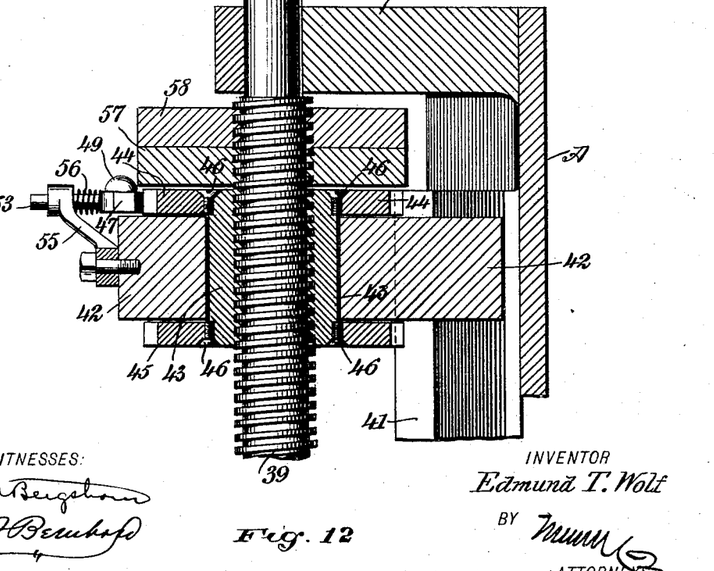
Fig. 12 is an enlarged vertical section on the line 12 12 of Fig. 11.

I will now proceed to describe the means by which the two series of die-pressure levers 6 $6^a$ are simultaneously actuated with a view to closing the felt die or mold and exerting a powerful compression on the felt therein. The levers forming each series are connected loosely at their outer ends to shiftable rods 14 15, arranged horizontally on the respective sides of the frame and capable of movement in arcs of circles with the series of levers 6 $6^a$ on the centers afforded by the arbors 5 $5^a$. These rods or arbors are connected at their respective ends with the vertical pairs of links or rods 16 17, and the lower ends of these links are provided with wrist-pins 18, arranged to fit in the arcuate slots 19 of the worm-gears 20 21. The end frames A A' are provided at their lower portions with suitable shaft-bearings, which accommodate the horizontal counter-shafts 22 23, disposed longitudinally of the machine on the respective sides thereof, each counter-shaft being provided at one end with a worm-gear 20 and at its opposite end with a similar worm-gear 21, the two worm-gears on each counter-shaft having arcuate slots 19 disposed in similar positions. The two counter-shafts 22 23 are adapted to rotate in opposite directions simultaneously and at equal speeds, and to this end I employ driving-shafts 24 25. (See Figs. 2 and 5.) The driving-shaft 24 is arranged in a horizontal position across the end frame A and directly above the counter-shafts 22 23 and the gears 20 thereon, said shaft 24 being journaled in appropriate bearings 26, secured rigidly to the end frame A, as shown by Fig. 5. This shaft 24 is provided with fast and loose pulleys 27 28, with either of which is adapted to engage a shiftable driving-belt 29. The said driving-shaft 24 is also provided with worms 30, which are disposed directly over the gears 20 to have intermeshing engagement therewith, (see Figs. 1 to 3, inclusive,) and said shaft 24 is also provided with a pair of bevel-gears 31 32, the latter being disposed in facing relation and mounted loosely on the shaft. The other shaft, 25, is disposed in a horizontal position across the other end frame A' directly over the gears 21 on the counter-shafts 22 23, said shaft 25 being journaled in suitable bearings 33, which are fixed to said end frame A'. This shaft 25 is provided with worms 34, arranged to mesh directly with the worm-gears 21, and the shaft is furthermore provided with a pair of loose facing bevel-gears 35 36, similar to the gears 31 32 on the shaft 24, which is equipped with the pulleys 27 28. Said shafts 24 25 are equipped similarly to one another, except that the shaft 24 has the belt-pulleys. The end frames A A' are furthermore provided with vertically-alined shaft-bearings 37 38, and in these bearings are journaled vertical threaded shafts 39, one at each end of the machine-frame. Each vertical threaded shaft is provided at its lower end portion with a bevel-gear 40, disposed between the facing bevel-gears 31 32 or 35 36 on one horizontal shaft 24 or 25, said bevel-gear 40 being in intermeshing engagement with both of the gears on the horizontal driving-shaft, so as to be driven in one direction or the other, according to the particular gear 31 32 or 35 36 which may be made fast with said horizontal shaft. The end frames A A' are also provided with vertical flanges 41, forming a vertical guideway adjacent to each vertical screw-shaft, and in this guideway is slidably confined a vertically-movable cross-head 42, one of which is provided at each end of the machine-frame. Each cross-head has a nut 43 mounted loosely therein, and said nut has threaded engagement with the vertical screw-shaft 39, whereby the rotation of the screw-shaft will impart traveling movement to the nut and the cross-head in a direction limited by the vertical guide 41. This nut of the cross-head is equipped with two ratchets 44 45, which are fastened in a suitable way to the upper and lower faces of the nut—as, for example, by the screws 46. One of the ratchets, 44, has teeth running in a left-hand direction, while the other ratchet, 45, has teeth running in a right-hand direction, the teeth of the ratchets being thus reversely disposed. The upper ratchet, 44, is adapted to be engaged by a pawl 47, which is hung at 48 on the crosshead and is provided near its free end with an upstanding lip or shoulder 49. The lower ratchet, 45, is likewise adapted to be engaged by a pawl 50, (indicated by full and dotted lines, respectively, in Fig. 11,) said lower pawl being hung on the under side of the crosshead at 51 and having a lip or shoulder 52, the latter depending from the pawl. The two pawls are normally pressed inward toward their ratchets by the action of stems 53, which are fitted slidably in sleeves 54 of a bracket 55, that is bolted to the slidable cross-head 42, and around these stems are fitted the coiled springs 56, which are seated against the arms of the bracket 55 and against suitable projections on the stems, so as to hold them in engagement with the pawls 47 50, respectively. In the upward movement of the cross-head the pawl 47 is adapted to be thrown out of engagement with the ratchet 44 by its shoulder 49 engaging with a stop-disk 57, which is screwed on the upper portion of the vertical screw-shaft 39 and is held against displacement thereon by a jam-nut 58. (See Fig. 12.)

The vertical screw-shaft 39 on the end frame A is driven directly from the horizontal driving-shaft 24, and this shaft is provided with a sprocket-gear 59, the latter having a hub or flange 60, which lies in the path of the shoulder 52 on the under side of the pawl 50, adapted to engage with the lower ratchet, 45, of the nut, said hub 60 serving to throw the lower pawl out of engagement with the ratchet when the cross-head and the follower-nut reach the limit of their movement in a downward direction. This sprocket-gear 59 is engaged directly by an endless sprocket-chain 61, which extends in a horizontal direction across the machine below the mold-bed and the pressure devices therefor. (See Fig. 5.) The sprocket-chain 61 is thus driven by the vertical screw-shaft, which in turn is propelled by the shaft 24, and this sprocket-chain is fitted to a sprocket-gear 62 on the other vertical screw-shaft 39, which is connected by the bevel-gears 40 and 35 or 36 to the companion driving-shaft 25, whereby the motion of the shaft 24 is transmitted by the two sets of bevel-gears, the screw-shaft, and the described train of sprocket-gearing to the shaft 25 for the purpose of rotating the latter at the same speed as the shaft 24, so that the countershafts 22 23 will be driven by trains of gearing at the respective ends thereof.

The endless sprocket-chain 61 is engaged by an idler-sprocket 63, suitably mounted on a horizontal member $A^2$ of the machine-frame, as shown by Fig. 5, and this sprocket-chain is adapted under certain conditions to be propelled by a hand-shaft 64. (See Figs. 2 and 5.) This hand-shaft is journaled in a fixed bracket 66 on the end frame A', and it is equpped with a hand-wheel 67 and with a sprocket-gear 68, the latter engaging with one or both leads of the sprocket-chain 61. The hand-wheel 67 occupies a position below the felt die or mold and the actuating devices therefor, so that the wheel may be easily reached and operated by hand in case of emergency.

The vertically-movable cross-heads 42 actuate the means for locking a molding or core-pressure device in immovable relation to the felt on the mold F. Each cross-head 42 is provided at its sides with lugs 69, disposed in pairs and adapted to receive the lower ends of links 70, said links being pivoted to said lugs 69 of the cross-head by transverse pins or bolts 71, as shown by Figs. 1, 3, 4, and 11. The upper ends of these links 70 are pivoted by pins or bolts 72 to the lower arms of irregular locking-levers 73, a pair of which is fulcrumed on each end frame A A' of the framework. These locking-levers are fulcrumed at points intermediate of their length by longitudinal and horizontal arbors 74, journaled in the end frames, and the inner ends of the levers of each pair are provided with locking-shoulders 75, which are adapted for engagement with stirrups 76 at the end portions of the molding-pressure devices for the longitudinal pressure-head adapted to carry the molding or core clamp, as will presently appear.

Figure 10:
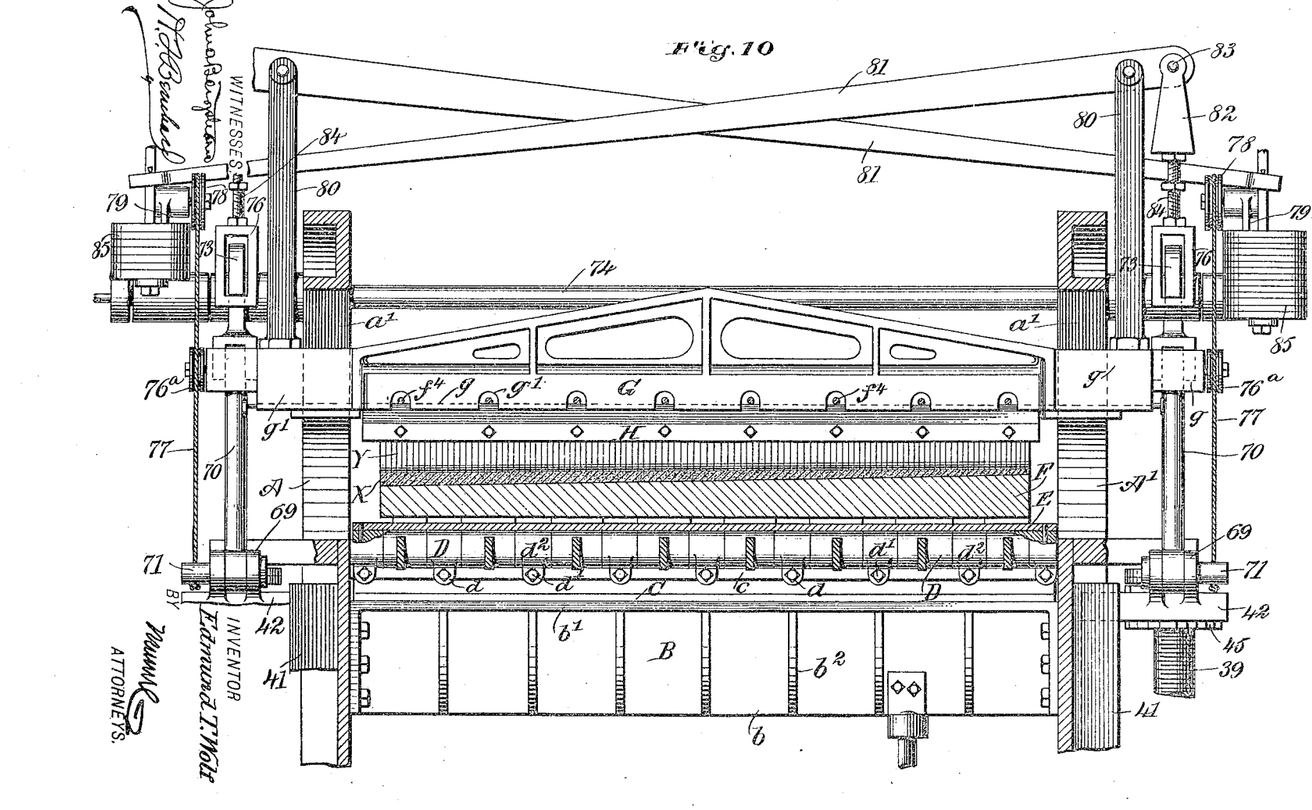
Fig. 10 is a longitudinal sectional elevation, on an enlarged scale, through that part of the machine adapted to sustain the removable felt die or mold and showing the longitudinal pressure-head, together with the independent molding-pressure devices for said head.

The end frames A A' are provided with openings $a$, which permit the ready introduction of the felt die or mold F through either end of the machine, and these end frames are also provided with vertical slots $a'$, which are disposed above the opening $a$ and open into the latter. The vertical slots $a'$ in the end frames accommodate the end portions of the horizontal pressure-head G, which extends longitudinally through the frame and is disposed in a plane above the position occupied by the felt die or mold. This pressure-head G is of trussed construction to successfully withstand the strain and pressure to which it is exposed in the operation of the machine, and said head is provided in its under side with a longitudinal recess or channel $g$ and with a series of transverse notches $g'$. (See Fig. 10.) In the recess or channel $g$ of this pressure-head is adapted to fit a horizontal clamp H, which is constructed to sustain the large number of moldings or cores for a set of piano-hammers. This clamp H may consist of two or more parts bolted removably together to allow of the introduction and removal of the moldings or cores, and said clamp is adapted to extend the full length of the pressure-head G when it is applied thereto, substantially as shown by Figs. 2 and 10. The clamp may be locked to the pressure-head by any suitable devices adapted to facilitate the insertion and removal of said clamp; but, as shown by Fig. 6, this clamp H is provided at each end with a socket $h$, into which is adapted to snap a latch-bolt $h'$, which is contained in suitable casings $h^2$, provided on the under side of the pressure-head G at the end portion thereof. This latch has a stem $h^3$, around which is fitted a coiled spring $h^4$, which acts against the latch to normally project it to the active position; but the stem $h^3$ may be manipulated for the purpose of retracting the latch and disengaging it from the mold or core clamp H.

The end portions of the longitudinal pressure-head G are fashioned to produce the guide portions $g^2$, which pass through the slots $a'$ and are adapted to be limited thereby to movement in a vertical path. The projecting guide portions $g^2$ of said pressure-head are equipped with guide-sheaves $76^a$, below which pass the cables 77, running upwardly from said sheaves $76^a$ over pulleys 78 and thence extending in downward directions to the pins or bolts 71, the free ends of each cable being fastened to a pair of these bolts or pins, which connect the links 70 with one traveling cross-head 42. The sheaves or pulleys 78 are loosely journaled on arbors which are carried by upstanding brackets 79, the latter being fastened in stationary positions on the projecting end portions of the spindles or arbors 74, which serve as the fulcra for the locking-levers 73.

Figure 1:
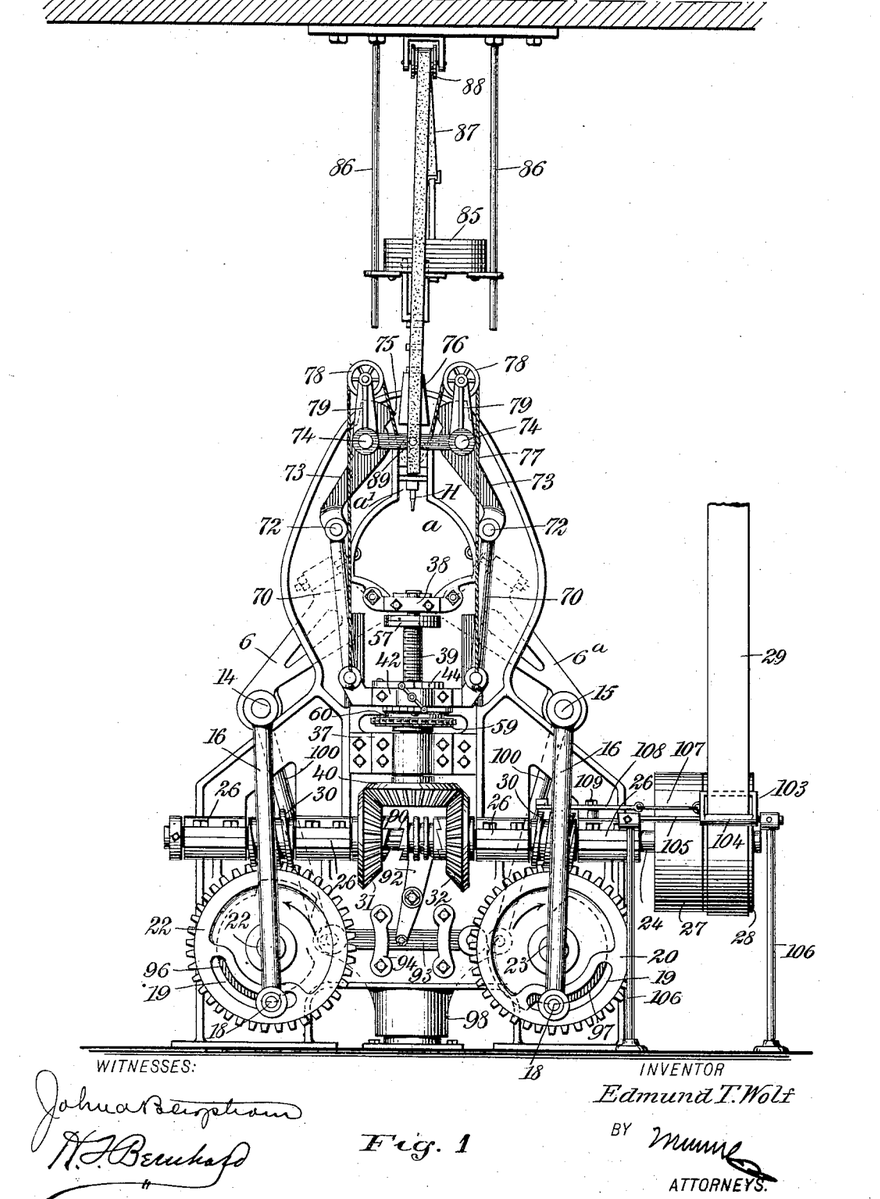
Figure 1 is a view in end elevation of a piano-hammer-making machine embodying my invention and illustrating the parts in their opened positions for the reception of the felt die or mold and the work.

The described connections between the cross-heads 42 and the pressure-head G allows the latter to move in a downward direction on the upward movement of the cross-heads, the latter being actuated by the screw-shafts 39; but when the cross-heads 42 are moved in downward directions the cables 77 pull on the sheaves $76^a$ and positively raise the pressure-head, whereby the cross-heads and the pressure-head move in opposite directions simultaneously. This pressure-head G is adapted to be forced downwardly in order to press the series of moldings or cores in the clamp H forcibly upon the felt resting upon the felt die or mold by the action of a molding-pressure mechanism, herein shown as part of the machine, but which forms no part of the present invention, because it constitutes the subject-matter of a separate application filed by me of even date herewith, Serial No. 157,954. This molding-pressure mechanism includes upstanding posts 80, which are fixed to the projecting guide portions $g^2$ of said pressure-head G, and on the upper ends of these posts are fulcrumed the levers 81, each lever being fulcrumed on one post in a way to produce a very short arm, as shown in Figs. 2 and 10. A yoke 82 is pivoted at 83 to the short arm of each lever 81, and from this yoke depends a threaded rod 84, which is fastened to the anchor-stirrup 76, the latter being adapted for engagement by the locking-shoulder 74 at the inner ends of the pair of locking-levers 73 when the molding-pressure mechanism is lowered to its active position. The long arm of each lever 81 is equipped with a weight 85, the latter being slidably guided by overhead rods 86, adapted to be fastened to a ceiling, as shown in Fig. 1, and these weights may be lifted by the employment of straps or cables 87, which are adapted to run over overhead sheaves 88 and to have their free ends fastened to a part of the machine—as, for example, the pin 89. By reference to Figs. 2 and 10 it will be seen that the levers 81 are disposed in crossing relation and that the long arms of said levers are equipped with weights 85, which may be raised manually through the agency of the straps or cables 87, whereas the short arms of said levers are provided with suspended stirrups adapted to be anchored or locked by the levers 73 when the pressure mechanism is lowered in order to hold the molding-pressure head G in fixed relation to the work. Each weight 85 consists of a plurality of superposed members adapted to be increased or decreased in number, according to the pressure required on the head G.

On each shaft 24 25 is arranged a shiftable double clutch 90, which is fastened to the shaft by a feather or spline in a way to make the clutch rotate with the shaft and at the same time permit it to have a limited slidable movement thereon. The clutch 90 is provided with clutch-faces at its respective ends, and one or the other of these faces is adapted to have interlocking engagement with a clutch-face on the hub of the bevel-gears 31 32 or 35 36, as clearly shown by Figs. 1, 3, and 4 of the drawings. This shiftable clutch 90 is also provided with worm-teeth 91, with which meshes the toothed end of a shipping-lever 92, fulcrumed at a point intermediate of its length on one end frame and having its lower end pivoted to a shipper-bar 93, the latter being arranged in a horizontal position for slidable movement in suitable guides 94. The end portions of each shipper-bar 92 are equipped with roller-shoes 95, which ride against suitable impelling-cams 96 97. A pair of these impelling-cams are secured on the counter-shafts 22 23 and on opposite sides of the shipper-bar 93, said cams being fashioned to positively move the shipper-bar back and forth and to give the required movement thereto for the purpose of moving the clutch 90 into and out of engagement with the gears on the horizontal driving-shafts at the required periods. When the machine is first started in operation, the clutch 90 engages with the gears 32 35, as shown by Figs. 1 and 5, in order that the screw-shafts 39 may be rotated in a direction to raise the cross-heads 42 for the purpose of moving the locking-levers 73 into engagement with the stirrups 76 after the molding-pressure head and the pressure mechanism shall have been lowered. At this period the cams on the shafts 22 23 assume such positions that the levers 92 are moved to the vertical position shown by Fig. 3 and each clutch 90 takes an idle position midway between the pair of opposing bevel-gears, thus allowing the vertical shafts 39 to remain at rest. The parts remain in this position until the felt die or mold shall have been closed and the materials subjected to pressure, after which the felt die or mold is locked. The levers 92 are now moved by the shipper-bars 93 and by the action of the cams 96 97 to move the clutches 90 into engagement with the gears 31 36, so that the threaded shafts 39 will be driven in an opposite direction for the purpose of lowering the cross-heads 42, whereby the levers 73 are withdrawn from engagement with the stirrups 76, so that the straps or cables 87 may be pulled down for the purpose of raising the pressure-weights 85 and the levers 81. After the cross-heads 42 shall have been lowered the cams 96 97 again become active to move the bars 43 and the levers 92 in a manner to shift the clutches 90 from engagement with the gears 31 36 into engagement with the gears 32 35, the clutches thus making one complete movement in an opposite direction, whereas the first shifting movement of the clutches allows them to remain idle or at rest between the periods of engagement with the pairs of gears.

Figure 7:
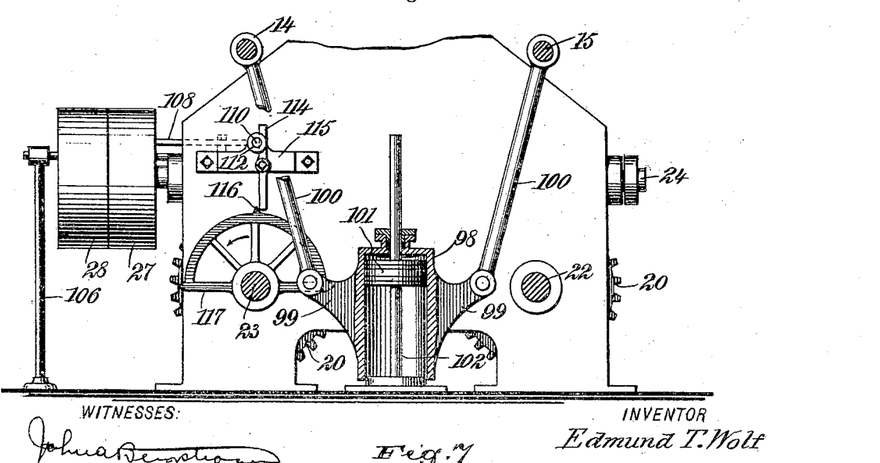
Fig. 7 is a detail sectional elevation taken in the plane of the dotted line 7 7 of Fig. 2 and showing the automatic stop-motion in elevation.

In connection with the shiftable arbors 14 15, which serve as the means for uniting the die-pressure levers 6 6ª of the two series with the links 16, adapted to be driven intermittently by the pairs of worm-gears 20 21, I employ a checking or retarding mechanism which takes up the shock or jar due to the return of the die-pressure devices to their opened positions and to the idle movements of the crank-pins 18 in the slots 19 of said worm-gears. This checking mechanism is shown by Figs. 2 and 7 of the drawings in the form of a dash-pot; but the specific type of checking mechanism is not material. The dash-pot has a cylinder 98, which is provided with lateral lugs 99, to which are pivoted the upwardly-diverging links 100, (see Fig. 7,) said links extending upwardly to the shiftable arbors 14 15 and connected loosely therewith. The dash-pot cylinder 98 is located centrally between the end frames and below the felt die or mold and the die and pressure mechanisms, and this cylinder is fitted slidably to a stationary piston 101, which is fastened to a rod 102, secured to the floor by any approved means.

The driving-belt 29 is loosely engaged by a belt-shipper yoke 103, which is provided with a sleeve 104, the latter being slidable freely on a horizontal guide-rod 105, secured to suitable posts 106. To this yoke 103 is connected a link 107, having its opposite end attached to one arm of a bent shipper-lever 108. (See Figs. 5 and 7.) Said shipper-lever is fulcrumed at 109 on a suitable part of the machine-frame, and to the other end of said shipper-lever is connected one end of a slidable rod 110, the latter playing freely in suitable fixed guides 111. This rod is provided at its outer end with a notched collar 112, against which acts a coiled spring 113 and with said collar is adapted to engage a locking-lever 114, the latter being fulcrumed to a fixed bracket 115 on the end frame A. The lower end of the lever 114 is disposed in the path of a series of projections 116 on a segment 117, the latter being fast with one of the counter-shafts 23, so as to rotate therewith.

The parts just described constitute an automatic stop-motion by which the belt 29 is shipped from the fast pulley 27 over to the loose pulley 28 at certain periods in the operation of the machine—first, when the cross-heads 42 reach the limit of their upward movement; second, on the arrival of the cross-heads at the limit of their downward movement, and, third, when the clutches 90 are shifted from the gears 21 36 over to the gears 32 35. The shipper-yoke 103 is moved by hand through any suitable appliance (not shown) to transfer the belt from the loose pulley 28 over to the fast pulley 27, and on this movement of the yoke 103 the lever 108 is moved in a direction to impart slidable movement to the rod 110, thus bringing the lever 114 into position to lock the parts in their adjusted positions. At the proper period in the rotation of the shaft 23 one of the projections 116 engages with the lever 114 to move it from the notch of the rod 110, thus allowing the spring 113 to act in a way which will move the lever 108 and the yoke 103 for the purpose of shifting the belt 29 from the fast pulley to the loose pulley.

The operation of the machine may be described as follows: With the parts of the machine in the positions shown by Figs. 1 and 8 the felt die or mold F is moved endwise into the machine, said felt die or mold sliding on the track or rail E and held in position thereby, the felt die or mold being open. A strip of felt X is laid on the felt die or mold, as shown by Fig. 8, said strip of felt having the tapering shape shown by Fig. 10. A number of moldings or cores Y are assembled in abutting engagement in the clamp H, and this clamp is adjusted in the groove $g$ of the pressure-head G and locked in position therein by the locking contrivances shown by Fig. 6. The operator now shifts the yoke 103 in a direction to transfer the belt from the idle pulley to the fast pulley, and the machine is started in operation. The shafts 24 25 are rotated simultaneously, owing to the described trains of gearing between them, and the worm-gears 20 21 are driven by the worms on said shafts 24 25 to drive the counter-shafts 22 23; but during this cycle of operations the crank-pins 18 are not actuated by the worm-gears 20 21, because said pins travel in the slots of the worm-gears, thus allowing the molding-pressure devices to remain at rest. At the same time the gears 32 36 drive the threaded shafts 39 in proper directions for the purpose of raising the cross-heads 42, thus slackening the cables 77 to permit the pressure-head to descend, and the links 70 are raised by the upward movement of these cross-heads 42 for the purpose of moving the locking-levers 73 into positions for engagement with the stirrups 76. Before the cross-head is fully lowered or at the same time that the cross-head is lowered the operator should disengage the straps 87 from the pin 89, and the weights 85 and the levers 81 are thus lowered, so that the stirrups will be engaged by the levers 73 and the pressure will be applied upon the cross-head G by the ponderosity of the weights augmented by the action of the levers. The moldings in the clamp H are thus pressed forcibly upon the strip of felt X. During the upward movement of the cross-heads 42, the pawls 47 make the upper ratchets 44 fast with the nuts 43, thus holding the nuts locked on the cross-heads 42 and permitting the screw-shafts 39 to raise the cross-heads; but when the cross-heads reach the limit of their upward movement the shoulders 49 of the pawls 47 engage with the fixed stop-nuts 57, thereby throwing said pawls 47 out of engagement with the ratchets 44 and permitting the nuts 43 to rotate with the screw-shafts 39, the parts thus acting as safety devices to prevent the cross-heads from moving too far in an upward direction. At the same time that the cross-heads reach the limit of their upward movements and the pressure-head is lowered the molding-pressure mechanism for said head is locked and the stop-motion becomes effective in shipping the belt from the fast pulley to the loose pulley. This is due to the fact that the segment 117 rotates with the shaft 23 for one of its projections 116 to engage with the lever 114 in a way to release said lever and permit the spring 113 to move the rod 110 and the lever 108 in a way to return the yoke 103 to the position shown by Fig. 5. While the shafts 39 are being driven from the shafts 24 25 the gears 20 21 and the shafts 22 23 are also turning; but, although the vertically-slidable cross-heads are effective in actuating the devices which lock the pressure-head G in the lowered position in order to press the moldings forcibly upon the felt, the mold F remains in the opened position, and the two series of pressure-levers 6 6ᵃ remain inactive at this period, because the wrist-pins 18 remain idle in the arcuate slots 19 of the worm-gears 20 21 while the latter make a quarter-turn from the positions of Fig. 1 to the positions of Fig. 3, whereby the moldings are pressed forcibly on the felt for a short period before the mold is closed. The operator now throws the machine into action again by shipping the belt to the fast pulley, and the gears 20 21 make a half-rotation for the purpose of carrying the crank-pins 18 from the positions shown in Fig. 3 to the positions shown in Fig. 4, the cross-heads, the molding-pressure head, and the pressure mechanism remaining in their locked positions. The links 16 are thus raised to correspondingly move the shiftable rods 14 15 and the two series of die-pressure levers 6 6ᵃ, thus making the roller-shoes 11 ride against the arms $f^3$ of the die or mold for the purpose of closing the latter and compressing the felt X around the series of moldings Y, a proper amount of cement having been first applied to the moldings to secure adhesion between the parts. The stop-motion again becomes active to throw the belt off the fast pulley, and thus allow the machine to come to a period of rest. The operator may now lock the die or mold in its closed position and disengage the clamp H from the pressure-head, after which the machine is again started in operation. At this period the clutches 91 mesh with the gears 31 36 for the purpose of rotating the screw-shafts in an opposite direction, and the pawls 47 thus have no influence on the nuts, whereas the pawls 50 make the lower ratchets fast with the nuts, so that the cross-heads 42 will travel in a downward direction until the shoulders 52 of the lower pawls engage with the hubs 60 of the sprocket-gears 59, thereby making said cross-heads 42 pull on the cables 77 in a way to raise the molding-pressure head G and the posts 80. The pressure mechanism may be raised by pulling the straps 89, which raises the weights 85 and the levers 81, said straps being engaged with the pin 89. At this cycle of operations the worm-gears 20 21 travel idly with respect to the crank-pins 18 to make a quarter-turn and cause the parts to again assume the positions shown by Fig. 1. During such period of idle motion of the gears 20 21 the levers 6 6ᵃ, the links, and the wrist-pins 18 are at rest in the raised positions shown by Fig. 4, the wrist-pins being at the dead-center and directly over the counter-shafts, and the worm-gears move an angular distance equivalent to the length of the slots 19 without influencing the wrist-pins and other parts of the mold closing and pressure devices. While such idle motion of the worm-gears takes place the cross-heads are being returned to their lowered positions and the pressure-head and pressure mechanism are being raised, as just described; but as the worm-gears 20 21 continue to turn the other ends of the slots 19 impinge the wrist-pins 18, thus carrying them past the dead-centers and allowing them to move quickly in the slots 19 of the gears for the purpose of quickly withdrawing the pressure-levers 6 6ᵃ from the mold. The shock or jar due to the weight of the levers on the quick movement of said pressure-levers and their associated parts is absorbed by the dash-pot devices, because the cylinder 98 is linked to the rods 14 15, the latter being connected to the series of arbors. The stop mechanism again becomes active in shipping the belt from the fast pulley, and the machine takes a position of rest, thus allowing the die or mold, with its charge or load, to be removed from the machine, while the clutches 90 are shifted into engagement with the gears 32 36 by the operation of the cams for the purpose of placing the machine in a condition to resume the operation.

The employment of the yieldable stems 9, which carry the shoes arranged to ride against the die or mold, is advantageous in permitting the molding-pressure devices to accommodate themselves to the die or mold, which acts on the wooden cores or moldings of different sizes; but the springs 13 are exceedingly strong, so as to secure the desired pressure on the mold when the pressure-levers 6 6$^a$ are raised.

Having thus described my invention, I claim as new and desire to secure by Letters Patent—

1. In a machine for making piano-hammers, the combination of a felt-die, a molding-pressure mechanism movable relatively to the felt-die, means for automatically locking the molding-pressure mechanism in its operative relation to the felt-die, die-pressure devices coöperating with said die, and means for actuating the die-pressure devices intermittently; said die-pressure-actuating means remaining inactive during the periods of shifting movement of the molding-pressure mechanism toward the felt-die.

2. In a machine for making piano-hammers, the combination of a felt-die, a molding-pressure mechanism shiftable relatively to the felt-die and capable of assuming a stationary, coöperative relation thereto, automatic devices for locking the molding-pressure mechanism in said coöperative relation to the felt-die, die-pressure devices coöperating with said felt-die and operable to close the latter subsequently to the presentation of moldings by said pressure mechanism to said felt-die, and driving devices for actuating the automatic locking devices and the die-pressure devices for the latter to remain idle during the periods that the automatic locking devices are being shifted into and out of locking relation to the molding-pressure mechanism.

3. In a machine for making piano-hammers, the combination of a felt-die, a pressure-head movable relatively to the felt die and having means for carrying and presenting hammer-moldings to said die, means for locking said pressure-head against movement away from the die when presented in coöperative relation thereto, die-pressure devices coöperating with said felt-die, and means for automatically actuating the pressure-head-locking devices during the periods of rest of the die-pressure devices.

4. In a machine for making piano-hammers, the combination of a felt-die, two series of die-pressure devices coöperating with the respective sides of said die, driving mechanism for intermittently actuating said die-pressure devices, a molding-pressure mechanism coöperating with the felt-die and adjustable independently of the pressure mechanism for said felt-die, means for locking the molding-pressure mechanism in coöperative relation to the felt-die, and other trains of driving devices for actuating the locking devices in the periods of rest of the die-pressure devices.

5. In a machine for making piano-hammers, the combination with a felt-die, and a molding-pressure head shiftable relatively thereto, of a pressure mechanism shiftable with said head and including locking-stirrups, slidable cross-heads movable relative to the pressure-head and in an opposite direction simultaneously therewith, locking devices controllable by said cross-heads and coöperating with said locking-stirrups for holding the pressure-head in a locked coöperative relation to the felt-die, and means for imparting traversing movement to the cross-heads.

6. In a machine for making piano-hammers, the combination with a felt-die, and a molding-pressure head shiftable relatively thereto, of traveling cross-heads, means connecting said cross-heads and pressure-head and operable to move the latter in one direction on a traversing movement of the cross-heads, locking devices controllable by the cross-heads and coöperating with the pressure-head, and means for giving traversing movement to the cross-heads.

7. In a machine for making piano-hammers, the combination with a felt-die, and a shiftable molding-pressure head, of slidable cross-heads having operative connection with said pressure-head and operable to positively lift the latter, means for imparting traversing movement to the cross-heads, and pressure mechanism coöperating with said pressure-head and controllable by the travel of the cross-heads; said pressure mechanism being effective in its action on the pressure-head subsequent to the movement of the latter into coöperative relation to the felt-die.

8. In a machine for making piano-hammers, the combination with a felt-die, of a molding-pressure head slidable by gravity toward the felt-die, slidable cross-heads movable relatively to the pressure-head, means connecting the cross-heads and the pressure-head for positively lifting the latter, and means for imparting traversing movement to the cross-heads.

9. In a machine for making piano-hammers, the combination with a felt-die, of a molding-pressure head slidable relatively to said die, cross-heads slidable with relation to the pressure-head, means connecting said cross-heads and the pressure-head and operable to move the latter on the travel of the cross-heads in one direction, means for imparting traversing movement to the cross-heads, and a pressure mechanism coöperating with said pressure-head and controllable by the travel of the cross-heads, said pressure mechanism including devices for locking it in position subsequent to the movement of the pressure-head in coöperative relation to the felt-die.

10. In a machine for making piano-hammers, the combination with a felt-die, of a molding-pressure head shiftable relatively thereto, cross-heads having operative connection with said pressure-head for moving the latter, a driving-shaft, means actuated by the driving-shaft for intermittently imparting traversing movement to the cross-heads, die-pressure devices coöperating with said felt-die, and trains of driving connections geared to the driving-shaft and timed to actuate the die-pressure devices in the intervals of rest of the cross-head-actuating means.

11. In a machine for making piano-hammers, the combination with a felt-die, and molding-pressure heads, of a driving-shaft, means actuated by said shaft for controlling the movement of said pressure-head, two series of die-actuating levers in coöperative relation to the respective sides of the felt-die, counter-shafts geared to the driving-shaft, and slotted gears on the counter-shafts and linked to the series of die-actuating levers for moving the latter with periods of rest or dwell in the intervals of movement of the pressure-head.

12. In a machine for making piano-hammers, the combination with a felt-die, a main shaft, and molding-pressure mechanism coöperating with said die and actuated intermittently by operative connections with said shaft, of two series of die-pressure levers mounted in coöperative relation to the felt-die, means driven by the main shaft for positively moving said levers at a desired interval toward the felt-die and operable to allow a quick return movement by the gravity of the levers, and means for absorbing the shock due to such quick return of the levers to normal position.

13. In a machine for making piano-hammers, the combination with a felt-die, a main shaft, and molding-pressure mechanism coöperating with said die and actuated intermittently by operative connections with said shaft, of two series of die-pressure levers mounted in coöperative relation to said die, slotted gears driven from the main shaft, links connected to said levers and having wrist-pins arranged to play at intervals in the slots of said gears, said links and gears being effective in closing the die through the action of the levers subsequent to the movement of the molding-pressure mechanism toward the die and also permitting the levers to return by gravity to their normal positions, and means for cushioning the return movement of the levers.

14. In a machine for making piano-hammers, the combination with a felt-die, a main shaft, and molding-pressure mechanism coöperating with said die and actuated intermittently by operative connections with said shaft, of two series of angular levers fulcrumed below the die and each lever provided with a guide, a cushioned stem movable in each guide, a shoe carried by each stem and engaging with the mold, and driving devices actuated by the shaft for positively moving the levers of the two series toward the mold.

15. In a machine for making piano-hammers, the combination with a felt-die, a main shaft, and molding-pressure mechanism coöperating with said die and actuated intermittently by operative connections with said shaft, of two series of angular levers fulcrumed below said die and provided with shoes arranged for engagement with opposite sides of the die, said levers and their shoes being movable to spread positions and free from the die, arbors uniting the levers of each series, links connected to said arbors, and gears driven by the shaft and having connection with said links.

16. In a machine for making piano-hammers, the combination with a felt-die, a main shaft, and molding-pressure mechanism coöperating with said die and actuated intermittently by operative connections with said shaft, of two series of pressure-levers in coöperative relation to the die and movable by gravity to lowered inoperative positions, operating means for moving said levers vertically against the action of gravity and effective in closing the die with periods of lost motion following the closure of the die, and means for absorbing the shock due to the return of the levers by gravity to normal positions.

17. In a machine for making piano-hammers, the combination with a two-part felt-die, and means for pressing hammer moldings or cores thereon, of two series of pressure-levers fulcrumed below said die and in coöperative relation to the respective parts thereof, yieldable shoes carried individually by the pressure-levers and engaging frictionally with the respective sides of said die, and automatic driving devices for simultaneously moving the levers toward said die.

18. In a machine for making piano-hammers, the combination with a two-part felt-die, and means for pressing hammer moldings or cores thereon, of two series of pressure-levers fulcrumed below said die and in coöperative relation to the respective sides thereof, a yieldable spindle carried by each pressure-lever and having a shoe disposed for engagement with one side of the die, buffers in operative relation to said spindle, and automatic driving devices for simultaneously moving the levers toward the die.

19. In a machine for making piano-hammers, the combination of a bed, a series of brackets clamped to said bed and supporting a track or rail, a mold fitted removably to said track or rail, arbors supported in said brackets below said mold, two series of pressure-levers each of which is hung on one of said arbors, means for moving said pressure-levers of the two series toward the mold simultaneously, and means for pressing the hammer moldings or cores upon said mold.

20. In a machine for making piano-hammers, the combination of a slidable pressure-head, a pressure mechanism therefor, means for locking said pressure mechanism in its lowered position, including locking members adapted for engagement with movable parts of said pressure mechanism, slidable cross-heads having operative connection with said locking members, and means for intermittently actuating said cross-heads.

21. The combination with a pressure-head, and a pressure mechanism therefor, of locking members disposed for engagement with movable parts of said pressure mechanism, slidable cross-heads having operative connection with said locking members, and reversible driving mechanism for positively raising and lowering the cross-heads with intervals of rest or dwell.

22. In a machine for making piano-hammers, the combination with a felt-die, and means for exerting pressure thereon, of a molding-pressure head movable into coöperative relation to said felt-die, slidable cross-heads, connections between the cross-heads and the pressure-head for moving the latter in an opposite direction to the cross-heads and simultaneously with the movement of said cross-heads, and reversible driving devices for positively raising and lowering the cross-heads with intervals of rest or dwell in the operation thereof.

23. In a machine for making piano-hammers, the combination of slidable cross-heads, screw-shafts having engagement with said cross-heads, a pressure-head connected operatively with said cross-heads for movement in an opposite direction thereto, driving-shafts having loose gears arranged to mesh with a gear on said screw-shafts, clutches for individually making the gears fast with the driving-shafts, and means for automatically shifting said clutches to bring either of the gears into operation and to disengage said clutch from both gears.

24. In a machine for making piano-hammers, the combination of slidable cross-heads, screw-shafts engaging therewith, a pressure-head, a pressure mechanism for said head, locking mechanism controllable by the movement of the cross-heads and operatively related to said pressure mechanism, horizontal driving-shafts having gears adapted to mesh with gears on the screw-shafts, and automatic clutch devices coöperating with said gears of the driving-shafts.

25. In a machine for making piano-hammers, the combination of vertically-slidable cross-heads, screw-shafts engaging with said cross-heads and having gears, transverse driving-shafts having loose gears meshing with the gears of the screw-shafts, clutches on said driving-shafts, a cam-controlled shipper mechanism having lever connection with said clutches, a pressure-head, a pressure mechanism for said head, and locking devices controllable by the movement of the cross-heads and having operative relation to elements of the pressure mechanism.

26. In a machine for making piano-hammers, the combination of vertical screw-shafts, gearing connecting said screw-shafts for simultaneously operating same, slidable cross-heads having threaded engagement with said screw-shafts, transverse driving-shafts, clutch-controlled gearing between the driving-shafts and the screw-shafts for positively rotating the latter alternately in opposite directions, a pressure-head, pressure devices for said head, and locking mechanism controllable by the cross-heads and coöperating with movable elements of the pressure mechanism.

27. In a machine for making piano-hammers, the combination with a pressure-head, of slidable cross-heads connected operatively with said pressure-head, a nut mounted loosely in each cross-head and provided with reversely-toothed ratchets, screw-shafts on which the nuts are screwed, pawls mounted on each cross-head and disposed for engagement with said ratchets, and means for disengaging the pawls from said ratchets as the cross-head approaches the limits of its movement in opposite directions.

28. In a machine for making piano-hammers, the combination with a pressure-head, of slidable cross-heads connected operatively with said pressure-head, a nut mounted loosely in each cross-head, a screw-shaft having threaded engagement with said nut, means for driving said screw-shaft in opposite directions, reversely-toothed ratchets fast with said nut, pawls carried by said cross-head and disposed for engagement with the respective ratchets, and means for automatically throwing the pawls out of engagement with their respective ratchets as the cross-head approaches the limit of its movement in opposite directions.

29. In a machine for making piano-hammers, the combination with a pressure-head, of slidable cross-heads connected operatively with said pressure-head, a nut idly mounted in each cross-head, screw-shafts having threaded engagement individually with said nuts, stop devices fixed on said screw-shaft, reversely-toothed ratchets fast with said nut, and pawls mounted on the cross-head and having means adapted for engagement with said stop devices as the cross-head reaches the limit of its movement in opposite directions.

30. In a machine for making piano-hammers, the combination of a driving-shaft, a mold, pressure devices actuated intermittently by said driving-shaft for forcibly closing said mold, a pressure-head arranged to present hammer moldings or cores to the mold, an independent pressure mechanism for said pressure-head, locking devices disposed for engagement with parts of said pressure devices for the pressure-head, and means for intermittently actuating the pressure-head and said locking mechanism.

31. In a machine for making piano-hammers, the combination with a felt-die, and a pressure-head therefor, of sets of pressure devices for forcibly closing said felt-die, a driving-shaft, slotted driving-gears connected operatively with said felt-die-pressure devices and adapted to intermittently actuate the same, a pressure mechanism for the pressure-head, cross-heads driven by the driving-shaft, a locking mechanism controllable by said cross-heads for holding the pressure-head in its operative position, and a stop mechanism for periodically arresting the motion of the machine when the cross-heads reach the limits of their movement in either direction and the die-pressure devices shall have completed their effective movement in closing the felt-die.

32. In a machine for making piano-hammers, the combination of driving-shafts having worms, counter-shafts having slotted worm-gears meshing with said worms of the driving-shaft, a mold, pressure devices operatively disposed to the mold and connected with said worm-gears to be actuated intermittently thereby, a pressure-head coöperating with the mold, a pressure mechanism for said head, cross-heads driven by the driving-shafts, a locking mechanism controllable by said cross-heads and coöperating with the pressure devices for the pressure-head, and belt-shipping mechanism driven by one of the counter-shafts.

33. In a piano-hammer-making machine, the combination of a felt-die, a molding-pressure head, a main shaft, non-slidable screw-shafts, traveling cross-heads actuated by the screw-shafts and connected with said pressure-head, clutch-controlled reversing-gearing between the main and screw shafts, means for periodically shifting a clutch of such gearing as the cross-heads reach the limit of their traveling movement, a molding-pressure mechanism coöperating with said pressure-head and controllable by the cross-heads to act on said pressure-head subsequent to the movement thereof into coöperative relation to the felt-die, and die-pressure devices actuated by the main shaft and coöperating with the felt-die.

34. In a piano-hammer-making machine, the combination of a felt-die, a molding-pressure head, a main shaft, non-slidable screw-shafts, traveling cross-heads actuated individually by the screw-shafts and connected operatively with said pressure-head, fast and loose gears between the screw and main shafts, double-faced clutches having coöperative relation to each pair of loose gears, shipper devices for moving the clutches periodically on the completion of the traversing movement of the cross-heads, a molding-pressure mechanism coöperating with the pressure-head and effective in acting thereon subsequent to the movement of said pressure-head into coöperative relation to the felt-die, and die-pressure devices actuated by the main shaft and coöperating with the felt-die.

35. In a piano-hammer-making machine, the combination with a felt-die, a molding-pressure head, and a main shaft, of counter-shafts driven from the main shaft and provided with clutch-controlling cams, die-pressure devices driven intermittently from the counter-shafts, screw-shafts having means connected with the pressure-head, gears between the main and screw shafts, and a clutch mechanism controllable by the cams on the counter-shaft and coöperating with said gearing for periodically controlling the pressure-head.

36. In a piano-hammer-making machine, the combination of a felt-die, a molding-pressure head, a main shaft, traveling cross-heads connected with said pressure-head, non-slidable screw-shafts geared to the cross-heads, trains of reversible driving-gears between the screw and main shafts, automatically-shipped clutches coöperating with said reversible driving-gears and effective in starting, stopping and reversing the screw-shafts, each clutch being shiftable between certain loose gears of the train and in one direction, with a period of rest or dwell, and by a continuous movement in the opposite direction, a molding-pressure mechanism coöperating with the pressure-head and acting thereon subsequent to the movement of said pressure-head into coöperative relation to the felt-die, and die-pressure devices actuated from the main shaft and coöperating with the felt-die.

37. In a piano-hammer-making machine, the combination with a felt-die, a molding-pressure head, and a main shaft, of cross-heads connected with said pressure-head, screw-shafts having threaded engagement with the cross-heads, gearing connecting said screw-shafts for insuring rotation thereof at equal speed, a train of reversible driving-gears between the main shaft and a screw-shaft, and a shipper-controlled clutch operable between loose members of the gear-train for periodically starting and stopping the screw-shaft.

38. In a piano-hammer-making machine, the combination with a felt-die, and a molding-pressure head, of cross-heads operatively connected with said pressure-head, longitudinal counter-shafts, cross-shafts geared to said counter-shafts, screw-shafts having threaded engagement with the cross-heads, trains of reversible driving-gears on the cross-shafts and the screw-shafts, clutches mounted on the cross-shafts for coöperation with certain gears of the trains thereon, cams on the counter-shafts, clutch-shippers controllable by said cams, and die-pressure devices actuated by said counter-shafts.

39. In a piano-hammer-making machine, the combination with a felt-die and a molding-pressure head coöperating therewith, of cross-heads operatively connected with said pressure-head for moving the same, a main shaft, counter-shafts geared to the main shaft, a train of driving-gears driven by the main shaft for imparting traversing motion to the cross-heads, die-pressure devices operable intermittently by the counter-shafts, and an automatic stop-motion controllable by one of the counter-shafts and operatively related to the main shaft for arresting the latter on the completion of the traversing motion of the cross-heads and subsequent to the effective period of the die-pressure devices.

40. In a piano-hammer-making machine, the combination with a felt-die, of a slidable pressure-head movable toward and from said die, pressure-levers acting on said head and carrying locking-stirrups, cross-heads connected with said pressure-head and operable to raise the latter, means for suspending and adjusting the pressure-levers, locking devices controllable by the traversing movement of the cross-heads and disposed for engagement with the locking-stirrups subsequent to the lowering of the pressure-head and the pressure-levers to their active positions, and means for imparting traversing movement to the cross-heads.

41. In a piano-hammer-making machine, the combination with a felt-die, and a molding-pressure head coöperating therewith, of vertically-slidable cross-heads, means connecting the cross-heads and the pressure-head for moving the latter by the movement of the former, nuts carried by the cross-heads, screw-shafts having threaded engagement with the nuts, reversible driving mechanism for said screw-shafts, means for starting and stopping the driving mechanism periodically, and means for arresting the traversing movement of the cross-heads by making the nuts run idly thereon as the cross-heads reach the limits of their movement in either direction.

In testimony whereof I have signed my name to this specification in the presence of two subscribing witnesses.

EDMUND T. WOLF.

Witnesses:
 CHARLES W. BALCH,
 FRANK A. BROBERG.